W. LAVALLEE.
SAFETY DRIVER FOR ROAD VEHICLES.
APPLICATION FILED APR. 20, 1920.
1,344,238. Patented June 22, 1920.
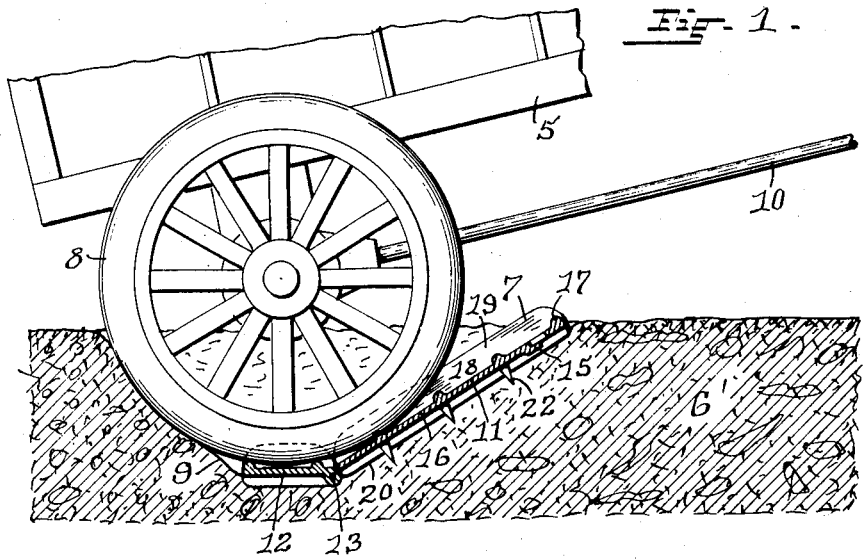
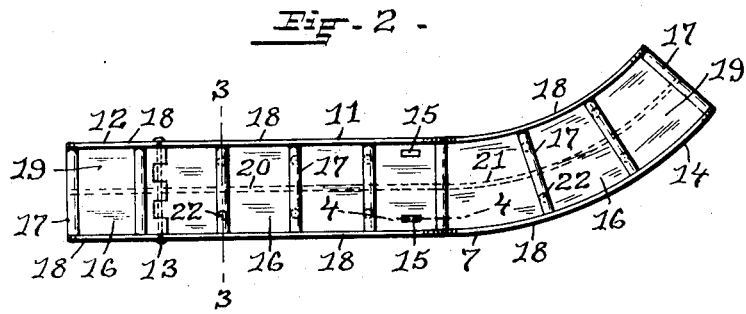
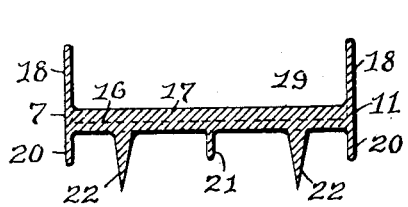 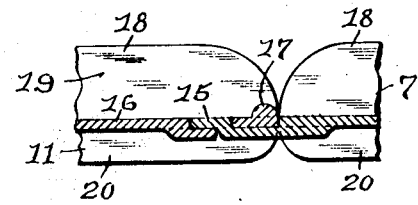
INVENTOR:
William Lavallee
By Chas. H. Luther
ATTORNEY.

UNITED STATES PATENT OFFICE.

WILLIAM LAVALLEE, OF CENTRAL FALLS, RHODE ISLAND.

SAFETY-DRIVER FOR ROAD-VEHICLES.

1,344,238.  Specification of Letters Patent.  Patented June 22, 1920.

Application filed April 20, 1920. Serial No. 375,357.

*To all whom it may concern:*

Be it known that I, WILLIAM LAVALLEE, a citizen of the United States, residing at Central Falls, in the county of Providence and State of Rhode Island, have invented a new and useful Improvement in Safety-Drivers for Road-Vehicles, of which the following is a specification.

My invention has reference to an improvement in devices used under and in front of vehicle wheels that have become embedded or bogged down in mud, sand, snow or the like and which can not be freed without the use of some auxiliary device.

The object of my invention is to improve the construction of such a device whereby through its use the wheels are not only lifted out of the depression in the ground, but when required, the wheels, after leaving the depression, are guided to one side of the depression on to the surface of the ground or snow.

My invention consists in the peculiar and novel construction of a safety driver for road vehicles, said safety driver having details of construction as will be more fully set forth hereinafter and claimed.

Figure 1 is a side view of the rear end of an automobile truck showing a rear wheel embedded in sand and my improved safety driver in position to lift the wheel out of the sand, in section.

Fig. 2 is a top plan view of my improved safety driver.

Fig. 3 is an enlarged transverse sectional view through the safety driver taken on line 3.3 of Fig. 2, and Fig. 4 is an enlarged longitudinal detail sectional view taken on line 4.4 of Fig. 2, through the hook joint of the device.

In the drawing 5 indicates the rear portion of an automobile truck, 6 sand and 7 my improved safety driver.

The truck 5 has the usual rear wheel 8 which has sunk down into a depression 9 in the sand 6, as shown in Fig. 1. The wheel 8 is operated in the usual way by a driving shaft 10 which in turn is operated by the truck engine, not shown.

My improved safety driver 7 consists of a straight main body section 11, a straight section 12 hinged at 13 to one end of the body portion and a curved section 14 detachably secured to the other end of the body section by a hook joint 15, as shown in Fig. 4. All of these sections 11, 12 and 14 have a bottom 16, transverse ribs 17.17 on the bottom and sides 18.18 forming a trough 19 the entire length of the sections. The sides 18.18 extend down below the bottom forming longitudinal ribs 20.20. Central longitudinal ribs 21.21 extend lengthwise of the sections and the sections 11 and 14 have spurs 22.22 extending downward from the bottoms, as shown in Fig. 3.

When my improved safety driver is in use, the safety driver is inserted into the depression in the sand, in front of the wheel, as shown in Fig. 1. The wheel is now revolved in a forward direction and rides easily up the trough 19 of the device assisted by the ribs 17.17, out of the depression on to the surface of the sand or ground. When it is necessary to move the truck sidewise on the surface, the curved section 14, which lies flat on the surface of the ground, is used.

My improved safety driver, although made preferably of cast iron, could be made of other material and the details of construction could be varied, within the scope of the appended claims.

Having thus described my invention I claim as new.

1. A safety driver for the purpose described, comprising a straight trough shaped body section having transverse ribs on the bottom, a corresponding straight trough shaped section hinged to one end of the body section and a corresponding curved trough shaped section detachably secured to the other end of the body section.

2. A safety driver for the purpose described, comprising a straight trough shaped body section having transverse ribs on its bottom, a corresponding straight trough shaped section hinged to one end of the body section, and spurs extending downward from the bottom of the body section.

3. A safety driver for the purpose described comprising a straight trough shaped body section having transverse ribs, on its bottom, a corresponding straight trough shaped section hinged to one end of the body section and longitudinal ribs on the bottoms of the sections.

4. A safety driver for the purpose described, comprising a straight body section having a bottom and parallel sides forming a trough, transverse ribs on the bottom, a corresponding straight end section hinged to one end of the body section, the body section having downwardly extending spurs on its bottom and both sections having downwardly extending ribs on their bottoms.

5. A safety driver for the purpose described, comprising a straight body section having a bottom and parallel sides forming a trough, transverse ribs on the bottom connecting the sides, a corresponding trough shaped straight end section hinged to one end of the body section, a corresponding trough shaped curved section detachably secured to the other end of the body section, downwardly extending ribs and spurs on the bottoms of the sections, and means for detachably securing the curved section to the body section.

In testimony whereof I have signed my name to this specification.

WILLIAM LAVALLEE.